Patented June 7, 1938

2,119,965

UNITED STATES PATENT OFFICE 2,119,965

ALLOY

Hans Heinrich Schwarzkopf, Reutte/Tirol, Austria, assignor to N. V. Molybdenum Comp., Amsterdam, Netherlands No Drawing. Application July 6, 1935, Serial No. 30,151. In Germany July 9, 1934

3 Claims. (Cl. 75—153)

This invention relates to an alloy for electrical purposes and particularly suitable for use as an electric contact material.

Pure metals and alloys have been proposed for electric contacts and welding electrodes. Such contacts must be of good electrical conductivity and sufficiently resistant to mechanical wear and to oxidation. Silver, copper, platinum and tungsten are preferably used as pure metals for electrical contacts and welding electrodes. Alloys of copper and silver have been proposed, which are, however, less suitable because larger quantities of silver reduce the electrical conductivity of the material whereas small additions of silver increase the hardness of the alloy to an insufficient extent.

In order to meet the requirements as regards resistance to wear and hardness, carbides of tungsten and tantalum have been employed for electric contacts or welding electrodes. Alloys of tungsten carbide or tantalum carbide with auxiliary metals having a low melting point have also been used.

The good conductivity of copper or silver is impaired for the uses referred to above by their low hardness which it has been proposed to increase by employing carbides. The latter are, however, of too high electric resistance.

It has been found unexpectedly that by an addition of cadmium to an alloy containing at least two metals of the copper group, that is to copper, silver and/or gold, an excellent material for electric contacts and welding electrodes is obtained. It has been established that for example by an addition of 1% cadmium the hardness of the alloy is increased to twice that of pure copper, without appreciably reducing the conductivity. Another advantage of contacts or welding electrodes made of an alloy of metals of the copper group with cadmium is that the cadmium prevents to a great extent the undesirable formation of metallic oxide at high operation temperatures. This surprising fact has not yet been scientifically explained. It may be that cadmium oxide starts to dissociate at red heat and a desionization of the arc occurs whereby it is rapidly extinguished and a longer life of the contact secured.

In any case, experiments have shown that an alloy of metals of the copper group which contains 0.1 to 10% cadmium is particularly suited as contact material for electrical purposes and welding electrodes.

Although in an alloy according to the invention the presence of cadmium increases its hardness as compared with the pure metals without appreciably affecting its electrical conductivity, nevertheless it may be desirable to further improve the hardness and resistance to wear of that alloy. This can be obtained by adding metals possessing a good conductivity, such as magnesium, beryllium, aluminum, tin and the like, an addition of 0.1 to 5% of these metals being sufficient. If the alloy is to be used for heavy service, for example as contact material for open air switches and the like, it may be used as prealloy to be added to metals of high melting point such as tungsten, molybdenum or tantalum. For such purposes the alloy forming the subject matter of the invention may be incorporated into tungsten, molybdenum or tantalum which fill up to 80% of the final material.

An alloy according to this invention may consist e. g. of 0.1 to 10% cadmium, 0.1 to 5% silver and/or gold, balance (85 to 99.8%) copper, or e. g. of 98% copper, 1% silver, 1% cadmium.

I claim:—

1. An alloy resistive to mechanical wear and oxidation, particularly adapted for electrical purposes including contacts and welding electrodes and as pre-alloy for electrical material, consisting of 0.1% to 10% cadmium, 0.1% to 14% of metal selected from the group consisting of silver and gold, balance copper.

2. An alloy resistive to mechanical wear and oxidation, particularly adapted for electrical purposes including contacts and welding electrodes and as pre-alloy for electrical material, consisting of 0.1% to 10% cadmium, 0.1% to 14% of metal selected from the group consisting of silver and gold, a fraction of 1% of desoxidizing metal selected from a group consisting of aluminum, beryllium and magnesium, balance copper.

3. An alloy for electric contacts and electrodes, consisting of 1% to 3% cadmium, 2% to 7% silver, balance copper.

HANS HEINRICH SCHWARZKOPF.